(12) United States Patent
Kim

(10) Patent No.: US 7,178,967 B2
(45) Date of Patent: Feb. 20, 2007

(54) BACKLIGHT ASSEMBLY AND LIQUID CRYSTAL DISPLAY APPARATUS HAVING THE SAME

(75) Inventor: Yong-Il Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 371 days.

(21) Appl. No.: 10/418,425

(22) Filed: Apr. 17, 2003

(65) Prior Publication Data

US 2004/0008512 A1 Jan. 15, 2004

(30) Foreign Application Priority Data

Jul. 11, 2002 (KR) .............................. 2002-40349

(51) Int. Cl.
*F21V 7/04* (2006.01)
(52) U.S. Cl. ................ 362/633; 362/225; 362/368; 349/58
(58) Field of Classification Search ............ 349/58; 362/30–31, 330–333, 558, 561, 224–225, 362/329, 217, 367–368, 632–634
See application file for complete search history.

(56) References Cited

U.S. PATENT DOCUMENTS

| | | | | |
|---|---|---|---|---|
| 3,736,602 | A * | 6/1973 | Miller ........................ | 5/176.1 |
| 3,824,638 | A * | 7/1974 | Bogar, Jr. .................... | 5/181 |
| 3,877,165 | A * | 4/1975 | Lumbard .................... | 40/779 |
| 3,955,298 | A * | 5/1976 | Kapstad ...................... | 40/782 |
| 5,283,674 | A * | 2/1994 | Hanaoka et al. ............. | 349/67 |
| 5,422,751 | A * | 6/1995 | Lewis et al. ................. | 349/59 |
| 5,432,626 | A * | 7/1995 | Sasuga et al. ................ | 349/58 |
| 5,504,605 | A * | 4/1996 | Sakuma et al. .............. | 349/58 |
| 5,617,251 | A * | 4/1997 | Ohta et al. ................... | 359/599 |
| 5,684,550 | A * | 11/1997 | Shibata et al. ............... | 349/62 |
| 5,779,339 | A * | 7/1998 | Konishi et al. .............. | 362/31 |
| 6,336,728 | B1 * | 1/2002 | Deloy .......................... | 362/31 |
| 6,441,874 | B1 * | 8/2002 | Saito et al. .................. | 349/70 |
| 6,445,373 | B1 * | 9/2002 | Yamamoto .................. | 345/102 |
| 6,480,245 | B1 * | 11/2002 | Sakamoto et al. ........... | 349/59 |
| 6,491,411 | B2 * | 12/2002 | Itoh ............................ | 362/246 |
| 6,494,587 | B1 * | 12/2002 | Shaw et al. .................. | 362/29 |
| 6,502,945 | B2 * | 1/2003 | Kim et al. .................... | 362/27 |
| 6,504,587 | B1 * | 1/2003 | Morishita et al. ............ | 349/58 |
| 6,520,346 | B1 * | 2/2003 | Liu .............................. | 211/26 |
| 6,542,206 | B1 * | 4/2003 | Saito ........................... | 349/58 |
| 6,762,807 | B2 * | 7/2004 | Lee et al. ..................... | 349/58 |
| 6,783,256 | B2 * | 8/2004 | Moon ......................... | 362/241 |
| 2001/0003471 | A1 * | 6/2001 | Lee et al. ..................... | 349/58 |
| 2001/0035923 | A1 * | 11/2001 | Cha et al. .................... | 349/65 |
| 2001/0050731 | A1 * | 12/2001 | An et al. ...................... | 349/58 |
| 2002/0044437 | A1 * | 4/2002 | Lee ............................. | 362/31 |

(Continued)

*Primary Examiner*—Sandra O'Shea
*Assistant Examiner*—Jason Moon Han
(74) *Attorney, Agent, or Firm*—MacPherson Kwok Chen & Heid LLP

(57) ABSTRACT

A backlight assembly and an LCD apparatus that includes the backlight assembly are disclosed. A first receiving container has at least two members that can be combined into a frame and receive a plurality of lamps and a light diffusing member. A receiving container may be fabricated using the two or more members. Even though the size of the frame made of the members is small relative to the LCD apparatus, the receiving container can be used with the LCD apparatus. Accordingly, manufacturing processes of the LCD apparatus may be simplified and cost of production may be reduced.

9 Claims, 13 Drawing Sheets

U.S. PATENT DOCUMENTS

2002/0057405 A1*  5/2002  Morishita et al. ........... 349/113
2002/0080298 A1*  6/2002  Fukayama .................. 349/58
2002/0135294 A1*  9/2002  Fujishiro et al. ............ 313/493
2003/0043310 A1*  3/2003  Cho ............................ 349/58
2003/0058380 A1*  3/2003  Kim et al. ................... 349/58
2003/0112379 A1*  6/2003  Jung .......................... 348/789

* cited by examiner

BACKLIGHT ASSEMBLY AND LIQUID CRYSTAL DISPLAY APPARATUS HAVING THE SAME

RELATED APPLICATION

This application claims priority from Korean Patent Application No. 2002-40349 filed on Jul. 11, 2002, which is incorporated by reference herein in its entirety.

BACKGROUND OF THE INVENTION

1. Field of the Invention

The present invention relates to a backlight assembly and an LCD (Liquid Crystal Display) apparatus, and more particularly to a backlight assembly for a large-sized screen and an LCD having the same.

2. Description of the Related Art

Today, information processing devices come in various shapes and are capable of functioning at high data processing speeds. In such information processing devices, information in the form of an electric signals are typically conveyed to users through a display device.

Conventional LCD apparatuses of light weight and compact sizes relative to a CRT type display device have been developed to achieve full-color and high-resolution. These LCD apparatuses operate based on the fact that liquid crystal molecules change their arrangements in response to an applied voltage. In other words, these LCD apparatuses display an image by converting variations in optical properties of liquid crystal cells into variations in visual properties. The LCD apparatuses typically receive light from a backlight assembly disposed under an LCD panel and display the image on the LCD panel.

The backlight assembly is classified into a direct illumination type LCD apparatus and an edge lighting type LCD apparatus according to the position of a light source. The direct illumination type LCD apparatus provides light to the LCD panel using a plurality of light sources disposed under the LCD panel, increasing the brightness properties of the image.

The direct illumination type LCD apparatus includes an LCD panel for displaying an image and a backlight assembly for providing the light to the LCD panel. The backlight assembly includes a plurality of lamps for generating the light, a diffusing plate disposed on the lamps, a reflecting plate disposed under the lamps and a receiving container for receiving the lamps, the diffusing plate and the reflecting plate. The diffusing plate diffuses the light from the lamps to provide light of uniform brightness distribution to the LCD panel and the reflecting plate reflects the light from the lamps to increase the amount of light supplied to the diffusing plate.

The receiving container includes a bottom mold frame, an upper mold frame and a bottom chassis. The bottom chassis includes a bottom surface and a sidewall extending from the bottom surface. The bottom mold frame receives the lamps and the diffusing plate. The reflecting plate is placed on the bottom surface of the bottom chassis and the bottom mold frame, in turn, is disposed on the reflecting plate. The upper mold frame is combined with the bottom mold frame, coupling the diffusing plate to the bottom mold frame. Then, the LCD panel is disposed on the upper mold frame. In order to fix the LCD panel to the upper mold frame, a top chassis is placed over the LCD panel and combined with the bottom chassis.

As the display size of the LCD apparatus has been gradually increasing, there has been a concomitant increase in the size of the receiving container. This trend of increasing receiving container size is undesirable because the bottom and the upper mold frames of the receiving container, generally, are manufactured by an injection molding process. The fact that the bottom and upper mold frames are manufactured using the injection molding process means that a new injection molding machine, transferring machine, etc., are needed every time there is an increase in the size of the mold frames to be manufactured. This need to constantly acquire new equipment not only drives up the manufacturing cost of the LCD apparatus but also adversely affects the quality of the manufactured LCD apparatuses. More specifically, since the injection molding process is performed under a high temperature condition, the mold frames may expand or contract, causing the end product to warp. As a result, the yield and the quality of the LCD apparatus are lowered.

BRIEF SUMMARY OF THE INVENTION

The present invention provides a backlight assembly design that is conducive to a higher yield.

The present invention also provides an LCD apparatus including the backlight assembly.

In one aspect of the invention, there is provided a backlight assembly comprising: a plurality of lamps for generating light; a light diffusing member for diffusing the light to have a uniform brightness distribution; and a first receiving container for receiving the lamps and the light diffusing member, the first receiving container having at least two members that are designed to be combined into a frame.

In another aspect, there is provided an LCD apparatus comprising: a plurality of lamps for generating light; a light diffusing member for diffusing the light to enhance uniformity of brightness distribution; a first receiving container for receiving the lamps and the light diffusing member, the first receiving container having at least two members that are designed to be combined into a frame; a second receiving container for receiving the first receiving container, the second receiving container having a bottom surface and sidewalls extending from the bottom surface; an LCD panel for receiving the light and displaying an image; and a chassis that is couplable with the second receiving container to place the LCD panel in contact with the first receiving container.

With the invention, the first receiving container may be fabricated using the two or more members even though the members are small in comparison with that of the LCD apparatus. Accordingly, manufacturing processes of the LCD apparatus may be simplified and the cost of production of the LCD apparatus may be reduced.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
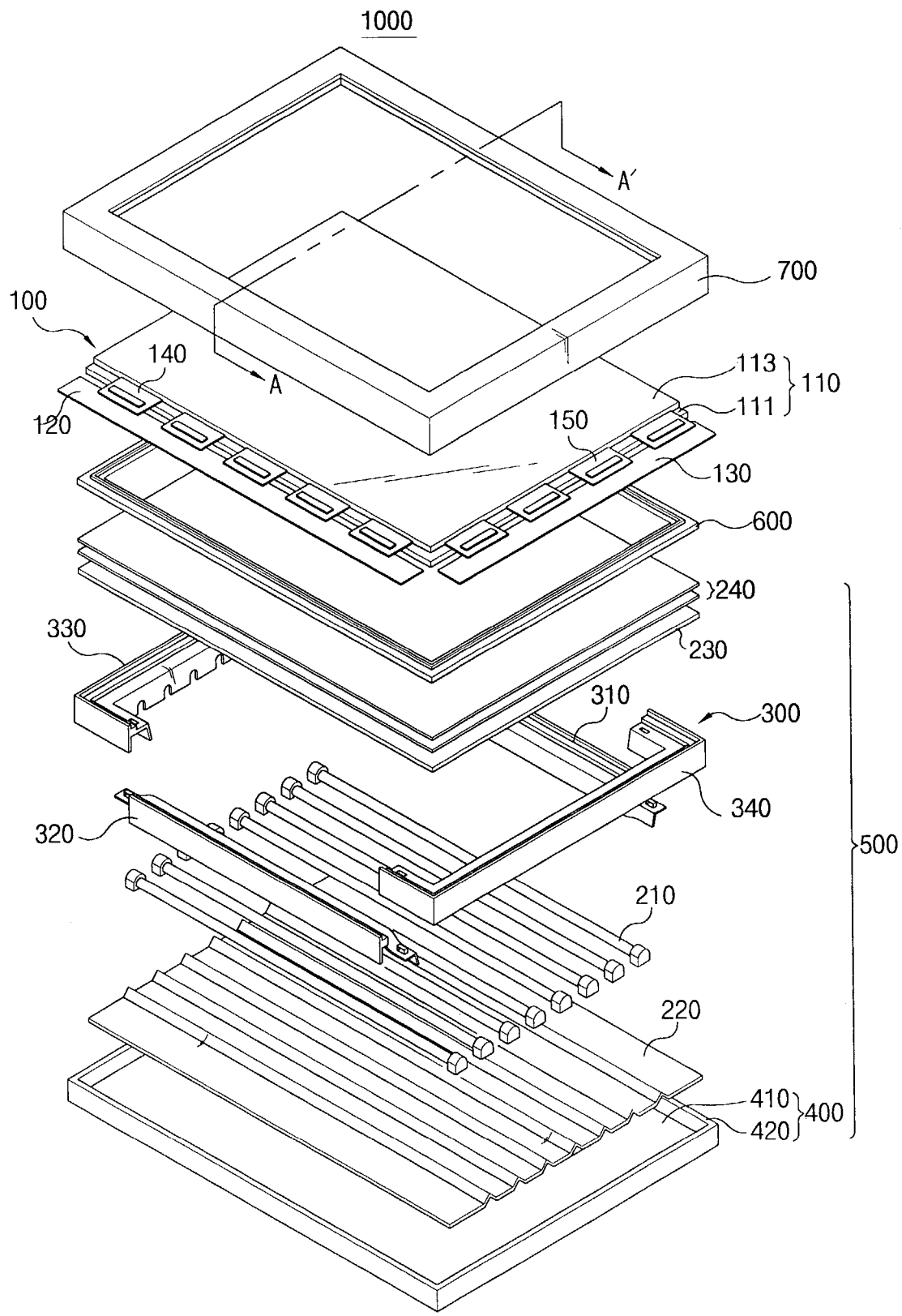
FIG. 1 is an exploded perspective view showing a structure of a direct illumination type LCD according to the present invention.
Figure 2:
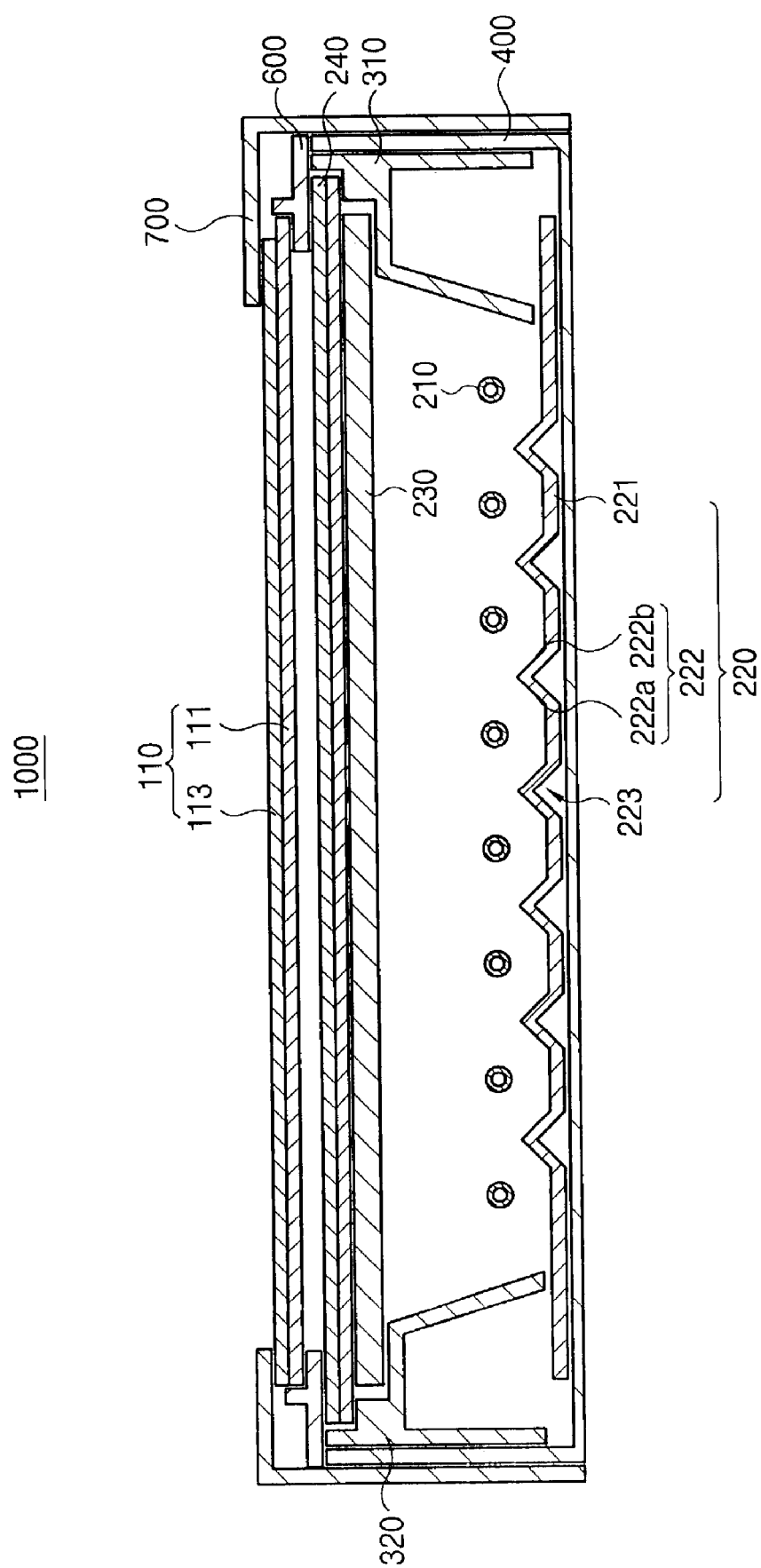
FIG. 2 is a cross-sectional view showing an assembled structure of the direct illumination type LCD shown in FIG. 1.

FIG. 1 is an exploded perspective view showing a structure of a direct illumination type LCD according to the present invention. FIG. 2 is a cross-sectional view showing an assembled structure of the direct illumination type LCD shown in FIG. 1.

Referring to FIGS. 1 and 2, the direct illumination type LCD apparatus 1000 includes a display unit 100 for receiving light and displaying an image in response to an image signal and a backlight assembly 500 for providing the light to the display unit 100.

The display unit 100 includes an LCD panel 110, a data PCB (Printed Circuit Board) 120, a gate PCB 130, a date TCP (Tape Carrier Package) 140 and a gate TCP 150. The LCD panel 110 includes a TFT substrate 111, a color filter substrate 113 and a liquid crystal (not shown) interposed between the TFT and color filter substrates 111 and 113.

The TFT substrate 111 is a transparent glass substrate on which TFTs are disposed in a matrix configuration. Each of the TFTs includes a source terminal connected to a data line, a gate terminal connected to a gate line and a drain terminal having a pixel electrode comprised of ITO (Indium Tin Oxide), which is a transparent conductive material. When an electric signal is applied to the data and gate lines, the source and gate terminals of each the TFTs receive the electric signal through the data and gate lines. Responsive to the electric signal, the TFTs are turned on or turned off, so that the drain terminal receives the electric signal needed to form a pixel.

The color filter substrate 113 is disposed so that it is facing the TFT substrate 111. RGB pixels, which are color pixels for emitting predetermined colors when the light passes therethrough, are formed on the color filter substrate 113 through a thin film process. A common electrode comprised of ITO is disposed on an entire surface of the color filter substrate 113.

When a power is applied to the gate and source terminals of the TFTs disposed on the TFT substrate 111, the TFTs are turned on so that an electric field is generated between the pixel electrode and common electrode of the color filter substrate 113. The electric field affects the aligning angle of the liquid crystal disposed between the TFT substrate 111 and color filter substrate 113. Accordingly, light transmittance of the liquid crystal is a function of the variation of the aligning angle of the liquid crystal. Thus, a desired image may be obtained by controlling the alignment of the liquid crystal.

As shown in FIG. 1, the data TCP 140 is connected to the data line of the LCD panel 110 to determine the timing of a data driving signal, and the gate TCP 150 is connected to the gate line of the LCD panel 110 to determine the timing of a gate driving signal. The data PCB 120, which is for receiving an image signal from an external source and applying the data driving signal to the data line, is connected to the data TCP 140. The gate PCB 130 for applying the gate driving signal to the gate line is connected to the gate TCP 150.

Although not shown in FIG. 1, the data PCB 120 may be integrated with the gate PCB 130 to form a single PCB (not shown) on the LCD apparatus 1000.

The backlight assembly 500 includes a plurality of lamps 210, a reflecting plate 220 disposed under the lamps 210, a diffusing plate 230 disposed on the lamps 210, an optical sheet 240 disposed on the diffusing plate 230, and a receiving container for receiving the lamps 210, reflecting plate 220, diffusing plate 230 and the optical sheet 240. The lamps 210 generate light and the diffusing plate 230 diffuses the generated light to achieve a brightness distribution that is as uniform as possible. The reflecting plate 220 reflects the light from the lamps 210 to increase the amount of the light supplied to the diffusing plate 230 and the optical sheet 240 controls brightness properties such as a visual angle of the light diffused by the diffusing plate 230.

Each of the lamps 210 is provided with a first lamp holder 211a (see FIG. 9) and a second lamp holder 212a (see FIG. 9) that accommodate opposite ends of each of the lamps 210. The first and the second lamp holders 211a and 212a fix the positions of wires that supply power to the lamps 210.

The receiving container includes a bottom mold frame 300, an upper mold frame 600, a bottom chassis 400 and a top chassis 700. The bottom mold frame 300 includes two or more members. In some embodiments, the bottom mold frame 300 includes first to fourth members 310, 320, 330 and 340 that can be coupled to one another. The bottom mold frame 300 receives the lamps 210 electrically connected to each other and positioned parallel to each other. The diffusing plate 230 and the optical sheet 240 are sequentially disposed on the bottom mold frame 300.

The bottom chassis 400 includes a bottom plane 410 and a sidewall 420 that extend from the bottom plane 410 to provide a receiving space. The bottom chassis 400 receives the reflecting plate 220 on the bottom plane 410. The reflecting plate 220, in turn, receives the bottom mold frame 300 on the reflecting plate 220.

The upper mold frame 600 is disposed on the optical sheet 240. Placing the diffusing plate 230 and the optical sheet 240 between the bottom mold frame 300 and the upper mold frame 600 fixes the positions of the diffusing plate 230 and the optical sheet 240. The upper mold frame 600 supports the LCD panel 110 disposed thereon. The upper mold frame 600 may include two or more members that can be coupled with one another, like the bottom mold frame 300.

The top chassis 700 is disposed on the LCD panel 110. The top chassis 700 includes a surface having an opening for displaying the images on the LCD panel 110 and a sidewall extending from the surface. This surface with the opening presses down on the edges of the LCD panel 110, and the sidewall of the top chassis 700 fits over the sidewall 420 of the bottom chassis 400 so that the LCD panel 110 is coupled to the upper mold frame 600.

Figure 3:
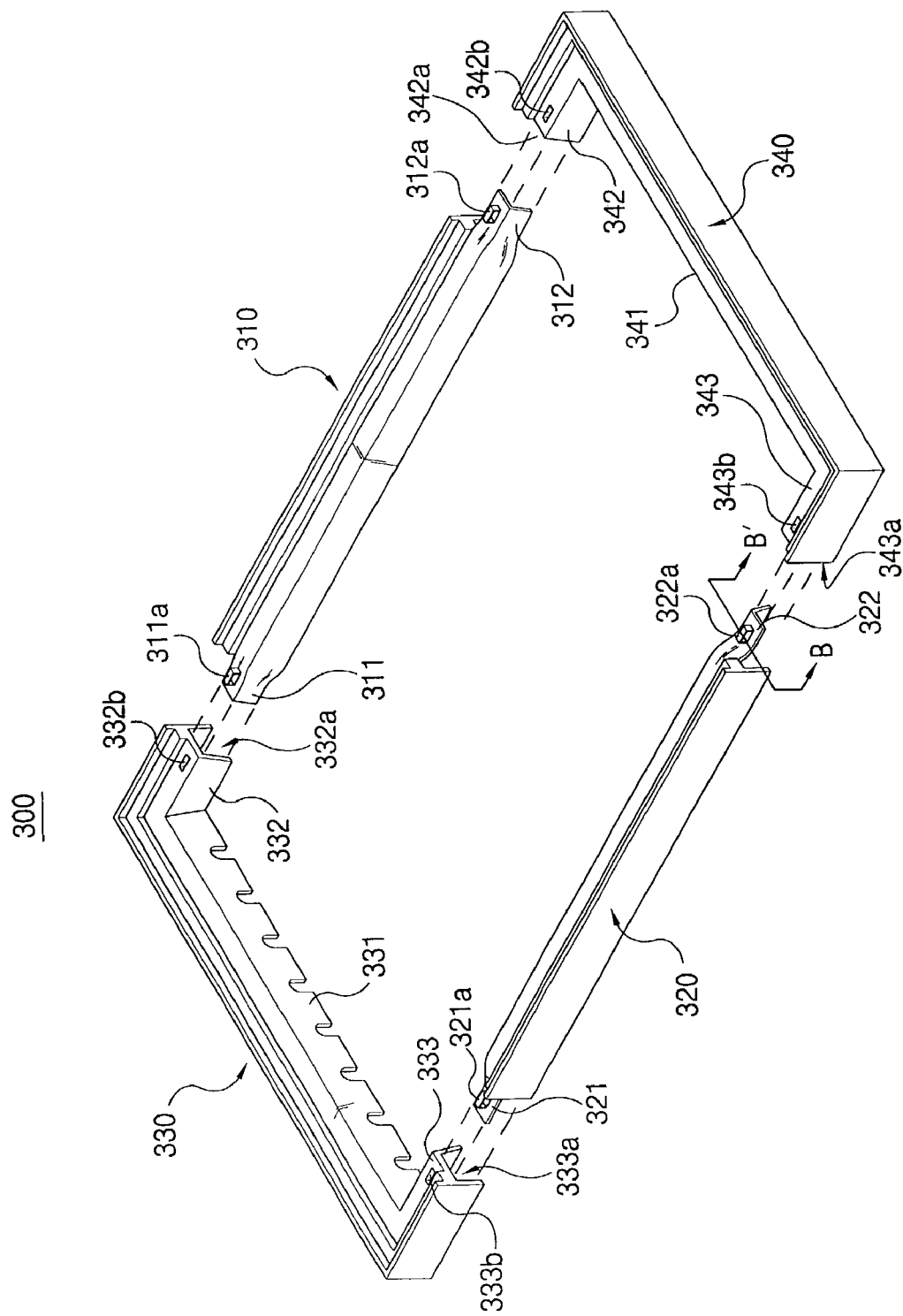
FIG. 3 is an exploded perspective view showing a structure of the bottom mold frame shown in FIG. 2.
Figure 4:
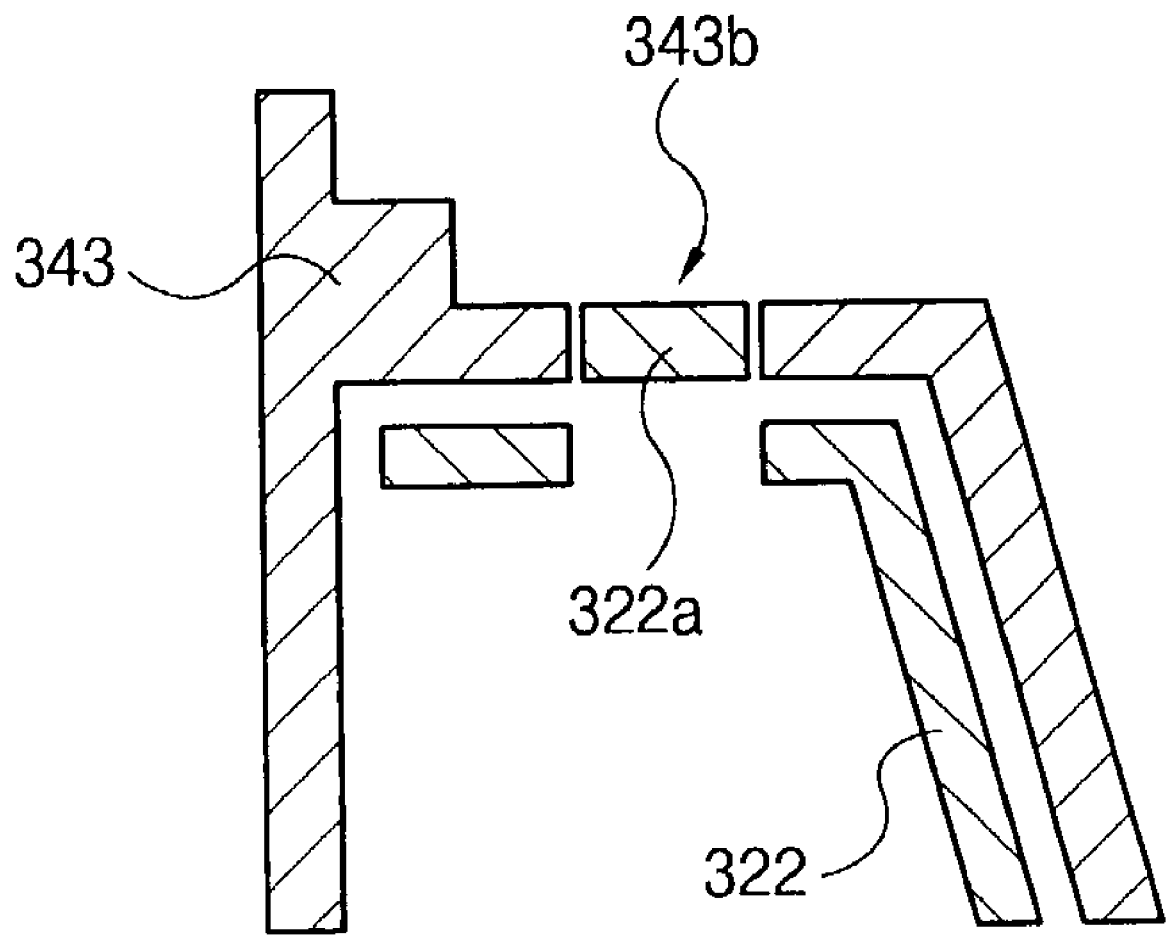
FIG. 4 is a cross-sectional view showing an assembled structure of the bottom mold frame shown in FIG. 3.

FIG. 3 is an exploded perspective view showing a structure of the bottom mold frame shown in FIG. 2. FIG. 4 is a cross-sectional view showing an assembled structure of the bottom mold frame shown in FIG. 3.

Referring to FIG. 3, the bottom mold frame 300 includes the first member 310, a second member 320 having a structure substantially similar to that of the first member 310, a third member 330 coupled to the first and the second members 310 and 320, and a fourth member 340 also coupled to the first and the second members 310 and 320. The third member 330 and the fourth member 340 are preferably coupled to opposite ends of the first member 310 and opposite ends of the second member 320 so that the four members form a rectangular frame.

The third member 330 includes a first main portion 331 with a first engaging portion 332 and a second engaging portion 333 extending from opposite ends of the first main portion 331 at approximately 90° to the first main portion 331. The first engaging portion 332 and the second engaging portion 333 may extend substantially parallel to each other. The fourth member 340 includes a second main portion 341 with a third engaging portion 342 and a fourth engaging portion 343 extending from opposite ends of the second main portion 341 at approximately 90° to the second main portion 331. The third engaging portion 342 and the fourth engaging portion 343 may extend substantially parallel to each other.

As shown in FIGS. 3 and 4, the first and second engaging portions 332 and 333 include a first receiving groove 332a for receiving a first end portion 311 of the first member 310 and a second receiving groove 333a for receiving a first end portion 321 of the second member 320, respectively. The third and the fourth engaging portions 342 and 343 include a third receiving groove 342a for receiving a second end portion 312 of the first member 310 and a fourth receiving groove 343a for receiving a second end portion 322 of the second member 320, respectively.

The first end portions 311 and 321 and second end portions 312 and 322 of the first and second members 310 and 320 are sized to be inserted into the first to fourth receiving grooves 332a, 333a, 342a and 343a, respectively. That is, the first end portions 311 and 321 and the second end portions 312 and 322 are not larger than that of the first to fourth receiving grooves 332a, 333a, 342a and 343a, respectively. With these insertions, the first end portions 311 and 321 and the second end portions 312 and 322 are coupled with the first to fourth receiving grooves 332a, 333a, 342a and 343a.

The first engaging portion 332 has a first engaging hole 332b and the second engaging portion 333 has a second engaging hole 333b. The first member 310 includes a first engaging protrusion 311a located on an upper surface of the first end portion 311 and designed to tightly fit into the first engaging hole 332b. Similarly, the second member 320 includes a second engaging protrusion 321a located on an upper surface of the first end portion 321 and designed to tightly fit into the second engaging hole 333b. The first and the second engaging protrusions 311a and 321a are extended through the first and second engaging holes 332b and 333b, respectively, coupling the first end portions 311 and 321 of the first and second members 310 and 320 to the third member 330.

The third engaging portion 342 has a third engaging hole 342b and the fourth engaging portion 343 has a fourth engaging hole 343b. The first member 310 includes a third engaging protrusion 312a located on an upper surface of the second end portion 312 and designed to tightly fit into the third engaging hole 342b. Similarly, the second member 320 includes a fourth engaging protrusion 322a located on an upper surface of the second end portion 322 and designed to tightly fit into the fourth engaging hole 343b. The third and fourth engaging protrusions 312a and 322a are extend through the third and fourth engaging holes 342b and 343b, respectively, coupling the second end portions 312 and 322 of the first and second members 310 and 320 to the fourth member 330.

In FIGS. 3 and 4, the first to fourth engaging protrusions 311a, 312a, 321a and 322a are located on the first and second members 310 and 320, and the first to fourth engaging holes 332b, 333b, 342b and 343b are provided with the third and fourth members 330 and 340. Although not shown in FIGS. 3 and 4, the first to fourth engaging protrusions 311a, 312a, 321a and 322a may be located on the third and fourth members 330 and 340 instead of on the first and second members 310 and 320. In this case, the first to fourth engaging holes 332b, 333b, 342b and 343b are located on the first and second members 310 and 320 instead of on the third and fourth members 330 and 340. The first to fourth members 310, 320, 330 and 340 may be made of a same material or different materials. If the first to fourth members 310, 320, 330 and 340 are made of the different materials in order to increase a strength of the bottom mold frame 300, the first and second members 310 and 320 may be made of metal and the third and fourth members 330 and 340 may be made of a material that is softer than metal, such as plastic.

Figure 5:
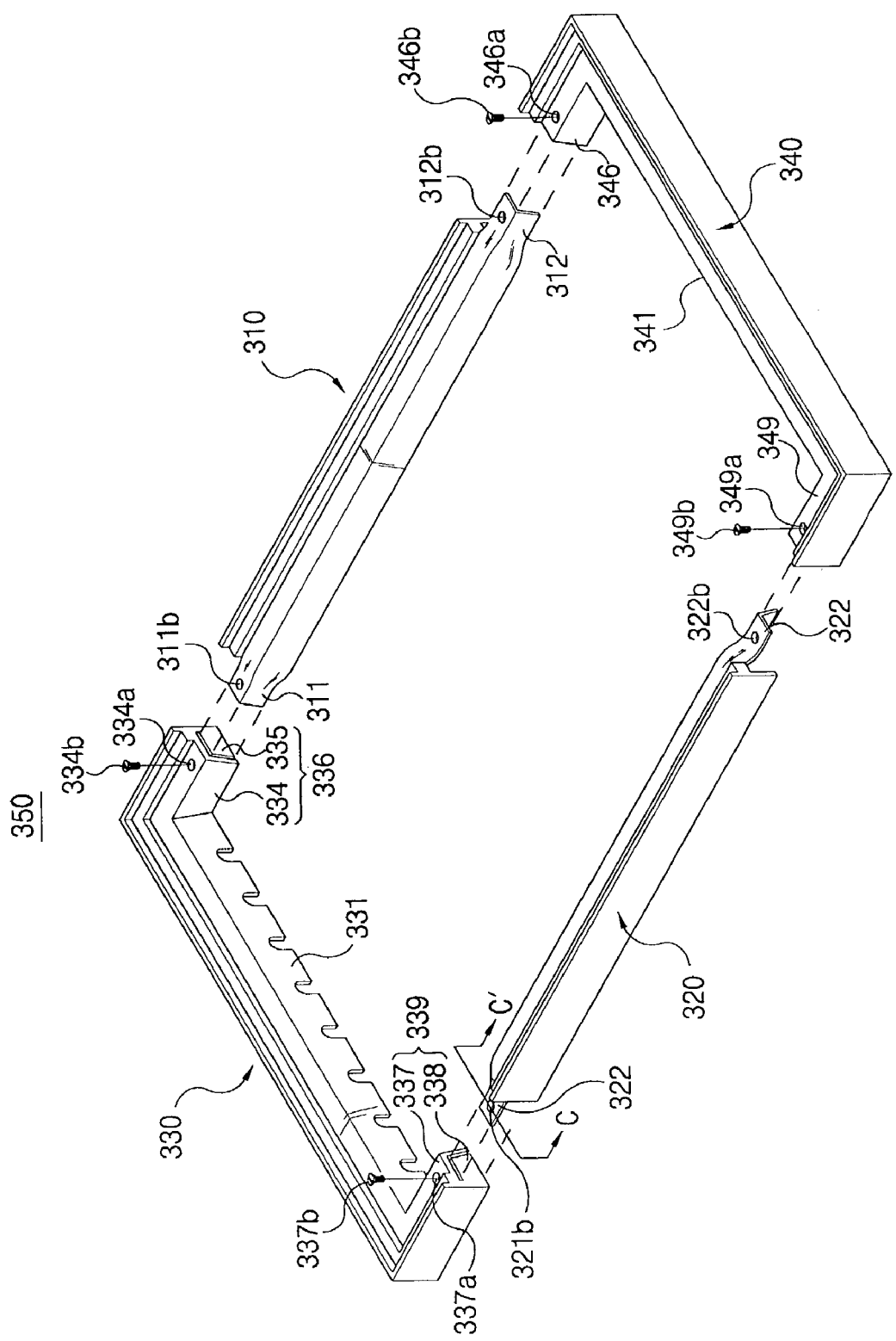
FIG. 5 is an exploded perspective view showing a structure of the bottom mold frame according to another embodiment of the present invention.
Figure 6:
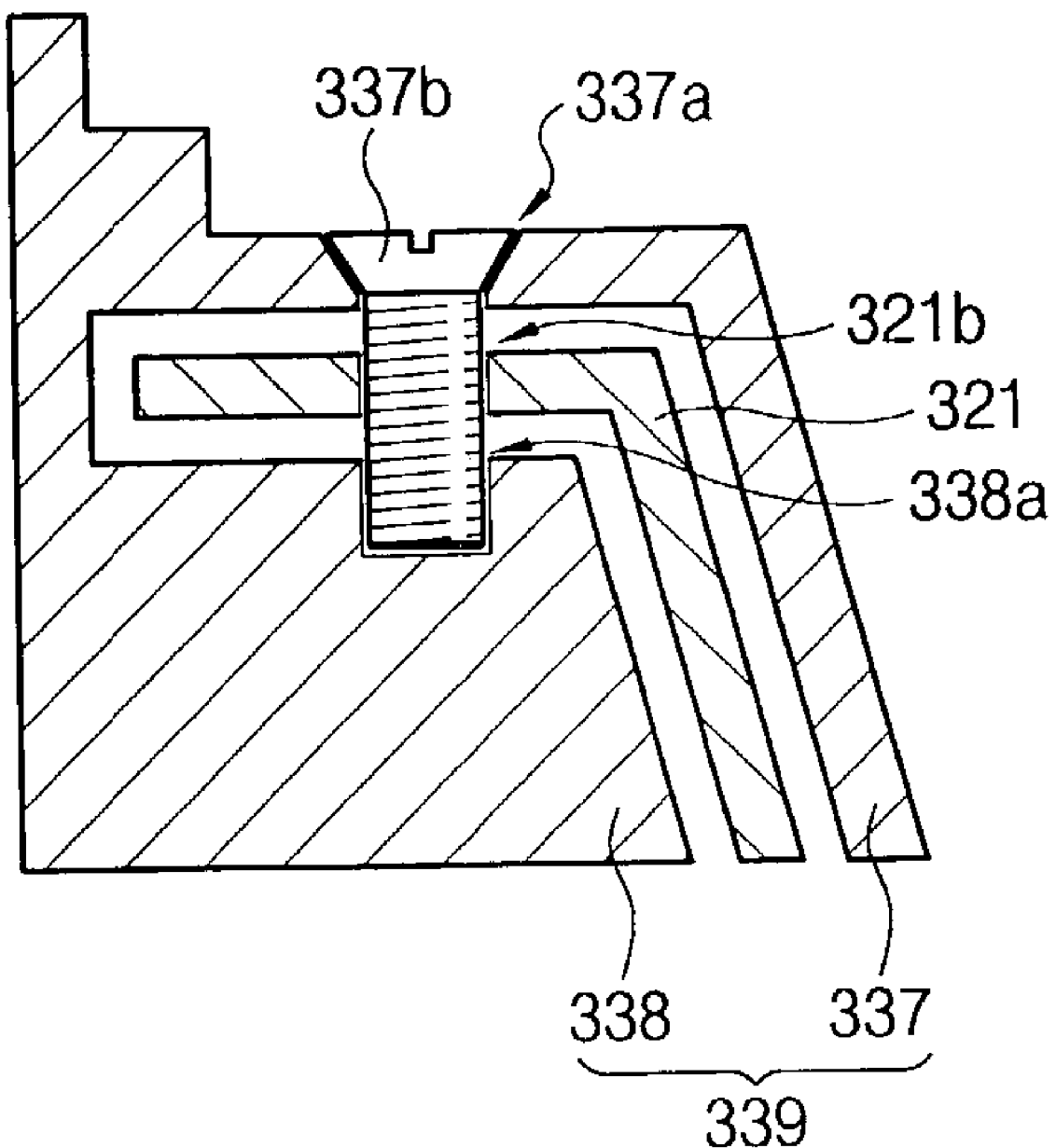
FIG. 6 is a cross-sectional view showing an assembled structure of the bottom mold frame shown in FIG. 5.

FIG. 5 is an exploded perspective view showing a structure of the bottom mold frame according to another embodiment of the present invention. FIG. 6 is a cross-sectional view showing an assembled structure of the bottom mold frame shown in FIG. 5.

Referring to FIGS. 5 and 6, a bottom mold frame 350 includes the first member 310, the second member 320 having a structure substantially similar to that of the first member 310, the third member 330 coupled to the first and the second members 310 and 320, and the fourth member 340 also coupled with the first and the second members 310 and 320. The third member 330 and the fourth member 340 are preferably coupled to opposite ends of the first member 310 and opposite ends of the second member 320 to form a rectangular frame.

The third member 330 includes a first main portion 331 with a first engaging portion 336 and a second engaging portion 339 extending from opposite ends at approximately 90° to the first main portion 331. The first engaging portion 336 and the second engaging portion 339 may extend substantially parallel to each other. The fourth member 340 includes a second main portion 341 with a third engaging portion 346 and a fourth engaging portion 349 extending from opposite ends of the second extending portion 341 at approximately 90° to the second main portion 331. The third engaging portion 346 and the fourth engaging portion 349 may extend substantially parallel to each other.

The first engaging portion 336 includes a first structure having a first outer section 334 and a first inner section 335. Likewise, the second engaging portion 339 includes a second structure having a second outer section 337 and a second inner section 338 (see FIG. 6). The first and the second outer sections 334 and 337 are spaced apart from the first and second inner sections 335 and 338, respectively, forming gaps into which the first end portion 311 of the first member 310 and the first end portion 321 of the second member 320 are inserted, respectively. Preferably, the gaps between the first and the second outer sections 334, 337 and the first and the second inner sections 335, 338 are wider than the thickness of the first end portions 311, 321 of the first and second members 310, 320.

The first engaging portion 336 has a first engaging hole 334a disposed on an upper surface of the first outer section 334 and a first engaging recess (not shown), disposed on an upper surface of the first inner section 335. This first engaging recess is aligned with the first engaging hole 334a. The second engaging portion 339 has a second engaging hole 337a disposed on an upper surface of the second outer section 337 and a second engaging recess 338a (see FIG. 6) disposed on an upper surface of the second inner section 338. This second engaging recess is aligned with the second engaging hole 337a.

The first member 310 is provided with a third engaging hole 311b on the first end portion 311 and positioned to align with the first engaging hole 334b when the first end portion 311 is inserted into the space in the first engaging portion 336. Similarly, the second member 320 is provided with a fourth engaging hole 321b on the first end portion 321 and positioned to align with the second engaging hole 337a when the first end portion 321 is inserted into the space in the second engaging portion 339.

The third and the fourth engaging portions 346 and 349 of the fourth member 340 have a structure that is substantially similar to that of the first and the second engaging portions 336 and 339 of the third member 330. That is, the third engaging portion 346 is provided with a fifth engaging hole 346a and a third engaging recess (not shown) that aligns with the fifth engaging hole 346a when the second end portion 312 of the first member 310 is inserted into the third engaging portion 346. Similarly, the fourth engaging portion 349 is provided with a sixth engaging hole 349a and a fourth engaging recess (not shown) that aligns with the sixth engaging hole 349a when the second end portion 322 of the second member 320 is inserted into the fourth engaging portion 349.

The first member 310 has a seventh engaging hole 312b on the second end portion 312. This seventh engaging hole 312b is positioned so that it aligns with the fifth engaging hole 346a when the second end portion 312 of the first member 310 is inserted into the third engaging portion 346 of the fourth member 340. Similarly, the second member 320 has an eighth engaging hole 322b on the second end portion 322. This eighth engaging hole 322b is positioned so that it aligns with the sixth engaging hole 349a when the second end portion 322 is inserted into the fourth engaging portion 349.

Screws may be used to securely couple the first member 310 and the second member 320 to the third member 330. After the first end portion 311 of the first member 310 is inserted into the first engaging portion 336 of the third member 330, a first screw 334b is screwed into the first engaging recess (not shown) of the first inner wall 335, so that the first end portion 311 is combined with the third member 330. This screw is long enough to extend through the first engaging hole 334a and the third engaging hole 311b. Likewise, after a second screw 337b is screwed into the second engaging recess 338a of the second inner wall 338 with the first end portion 321 of the second member 320 inserted into the second engaging portion 339 of the third member 330, thereby combining the first end portion 321 is coupled with the third member 330. This screw used to securely couple the second member 320 with the third member 330 is long enough to extend through the second engaging hole 337a and the fourth engaging hole 321b.

Screws may also be used to securely couple the first member 310 and the second member 320 to the fourth member 340. After the second end portion 312 of the first member 310 is inserted into the third engaging portion 346 of the fourth member 340, a third screw 346b is screwed into the third engaging recess (not shown), so that the second end portion 312 is combined with the fourth member 340. Likewise, after a fourth screw 349b is screwed into the fourth engaging recess (not shown) with the second end portion 322 of the second member 320 inserted into the fourth engaging portion 339 of the fourth member 330, the second end portion 321 is coupled with the fourth member 340. The screws 346b is long enough to extend through the fifth engaging hole 346a and the seventh engaging hole (not shown), and the screw 349b is long enough to extend through the fourth engaging hole 349a and the sixth engaging hole 322b.

Figure 7:
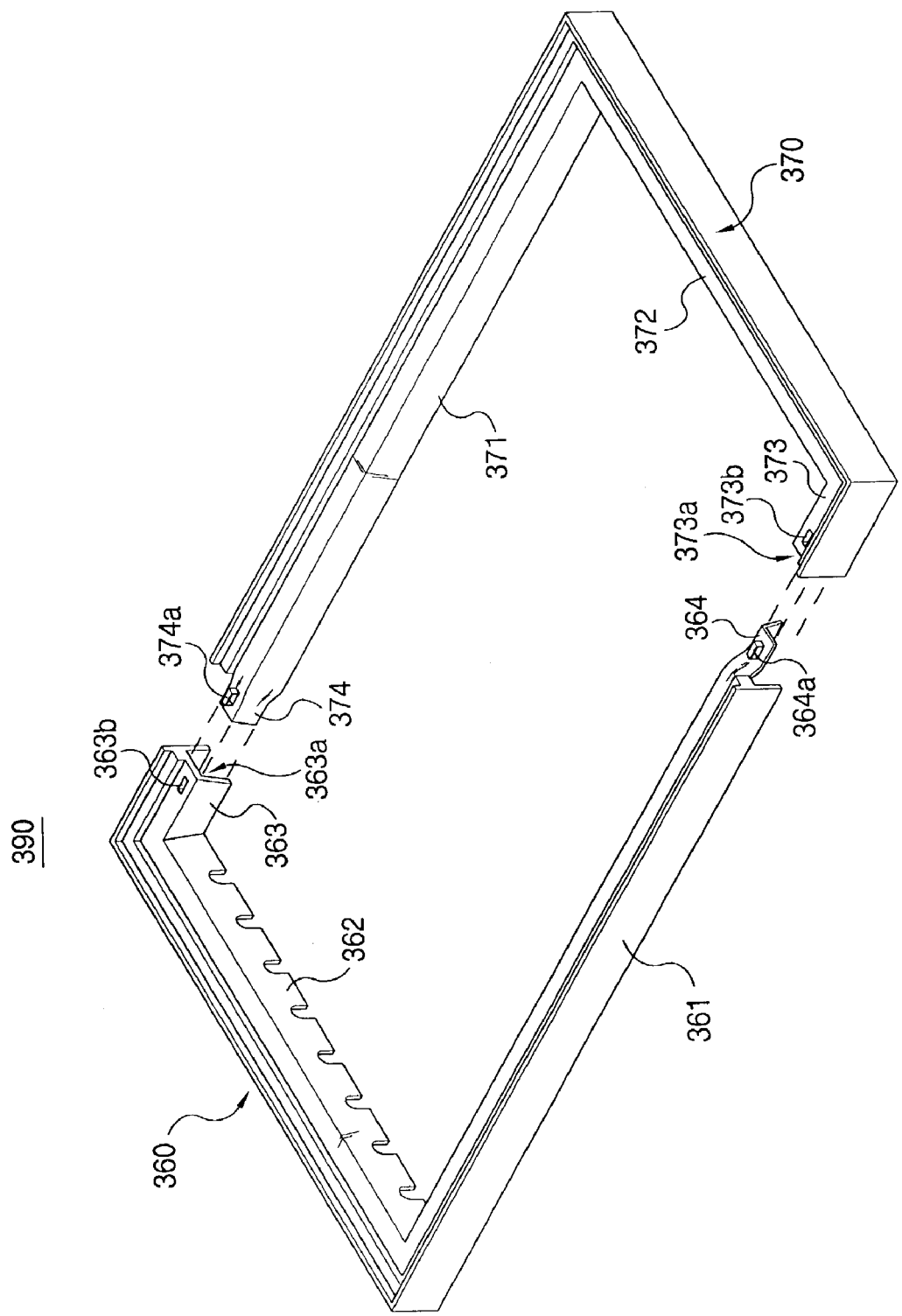
FIG. 7 is an exploded perspective view showing a structure of the bottom mold frame according to another embodiment of the present invention.

FIG. 7 is an exploded perspective view showing a structure of the bottom mold frame according to another embodiment of the present invention.

Referring to FIG. 7, a bottom mold frame 390 includes a first member 360 and a second member 370 combined with the first member 360.

The first member 360 includes a first main portion 361, a second main portion 362 extending from the first main portion 361 in a direction that is perpendicular to the first main portion 361, a first engaging portion 363 extending from the second body portion 362 in a direction parallel to the first main portion 361, and a second engaging portion 364 extending from an end portion of the first main portion 361.

The second member 370 includes a third main portion 371, a fourth main portion 372 extending from the third main portion 371 in a direction that is perpendicular to the third main portion 371, a third engaging portion 373 extending from the fourth main portion 372 in a direction parallel to the third main portion 371, and a fourth engaging portion 374 extending from an end portion of the third main portion 371.

The first member 360 may be completely combined with the second member 370 by engaging the first and second engaging portions 363 and 364 to the fourth and third engaging portions 374 and 373, respectively. For this combination of the first and second members 360 and 370, the first engaging portion 363 is provided with a first receiving groove 363a in which the fourth engaging portion 374 is received and the third engaging portion 373 is provided with a second receiving groove 373a in which the second engaging portion 364 is received.

Also, the first engaging portion 363 has a first engaging hole 363b and the third engaging portion 373 has a second engaging hole 373b. The fourth engaging portion 374 has a first engaging protrusion 374a corresponding to the first engaging hole 363b and the second engaging portion 364 has a second engaging protrusion 364a corresponding to the second engaging hole 373b.

The first engaging portion 363 of the first member 360 may be securely coupled with the fourth engaging portion 374 of the second member 370 by inserting the first engaging protrusion 374a into the first engaging hole 363b. Also, the second engaging portion 364 of the first member 360 may be securely coupled with the third engaging portion 373 of the second member 370 by inserting the second engaging protrusion 364a into the second engaging hole 373b. Coupling the first engaging portion 363 with the fourth engaging portion 374 and the second engaging portion 364 with the third engaging portion 373 completely combines the first member 360 with the second member 370. Although not shown in FIG. 7, the first member 360 may be coupled to the second member 370 using a screw in other embodiments.

Figure 8:
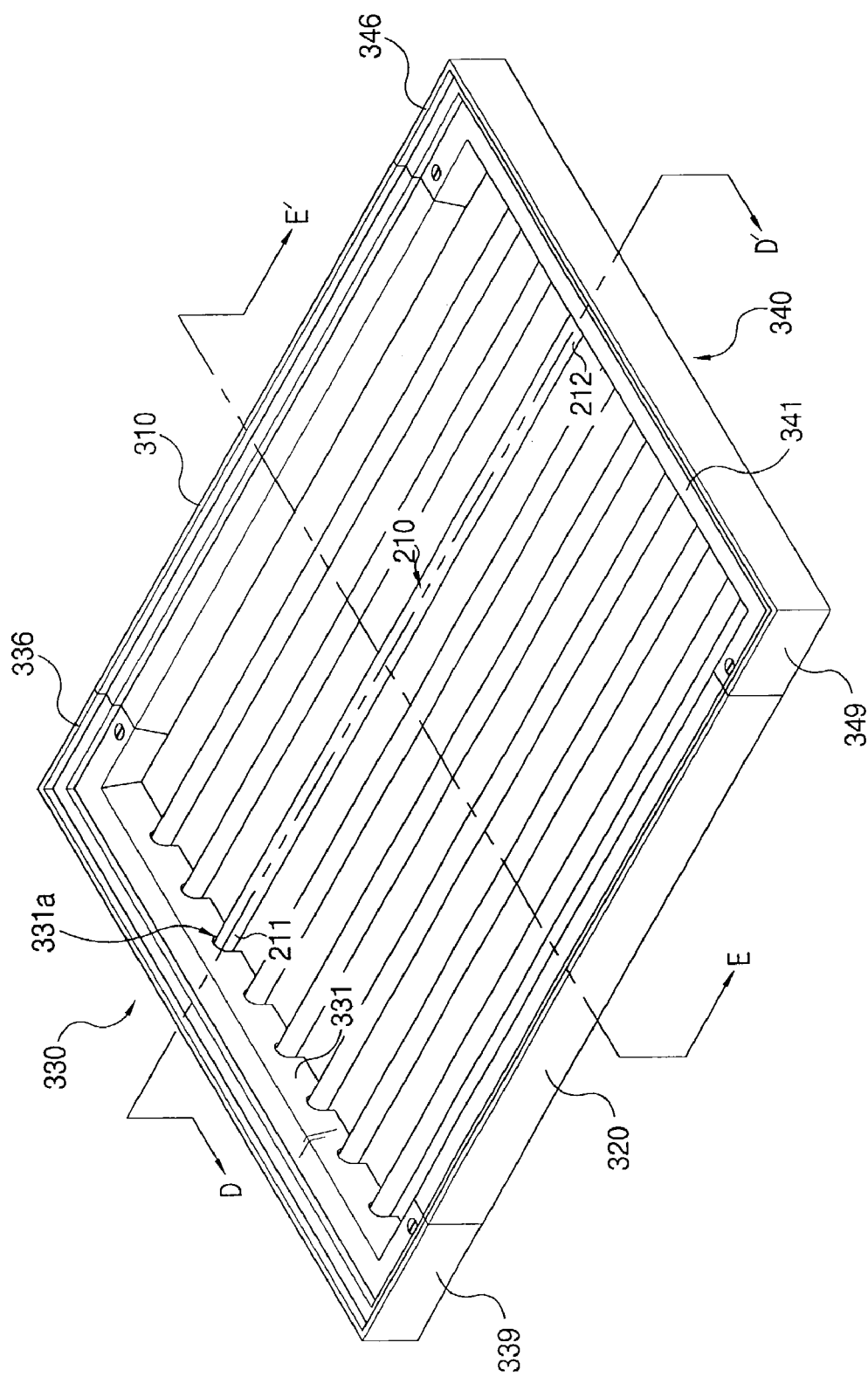
FIG. 8 is a perspective view showing an assembled structure between the lamp and bottom mold frame shown in FIG. 5.
Figure 9:
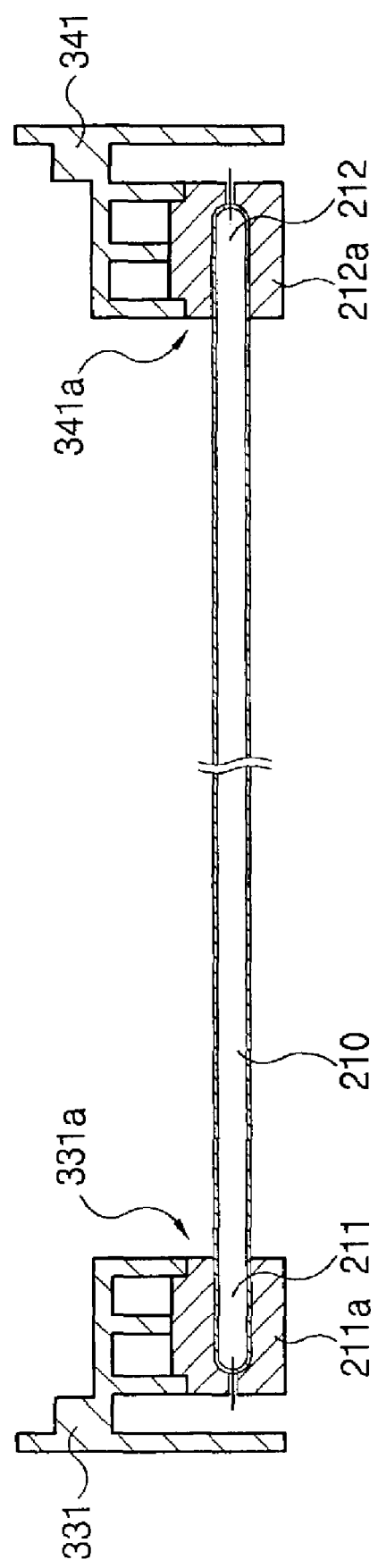
FIG. 9 is a cross-sectional view taken along the line D–D' showing an assembled structure between the lamp and bottom mold frame shown in FIG. 5.
Figure 10:
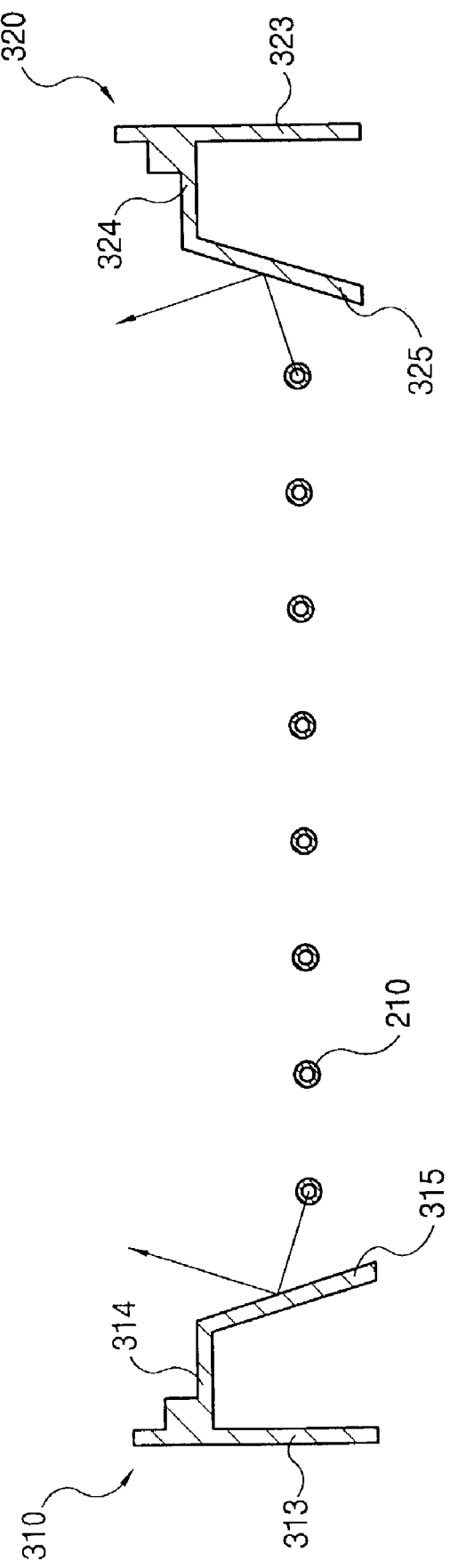
FIG. 10 is a cross-sectional view taken along the line E–E' showing an assembled structure between the lamp and bottom mold frame shown in FIG. 5.

FIG. 8 is a perspective view of an assembled structure including the lamps 210 of FIG. 1 and the bottom mold frame 350 shown in FIG. 5. FIG. 9 is a cross-sectional view of the assembled structure shown in FIG. 8 as viewed from a plane that includes line D–D'. FIG. 10 is a cross-sectional view of the assembled structure shown in FIG. 8 as viewed from a plane that includes line E–E'.

Referring to FIGS. 8 and 9, the bottom mold frame 350 (shown in FIG. 5) includes the first member 310, the second member 320 positioned parallel to the first member 310, the third member 330 connected to the first end portions 311 and 312 of the first and second end portions 310 and 320, and the fourth member 340 connected to the second end portions 312 and 322.

The third member 330 includes the first main portion 331 connected to the first engaging portion 336 and the second engaging portion 339 that extend from opposite ends of the first main portion 331 in a direction that is substantially perpendicular to the first main portion 331. The fourth member 340 includes the second main portion 341 connected to the third engaging portion 346 and the fourth engaging portion 349 that extend from opposite ends of the second main portion 341 in a direction that is substantially perpendicular to the second main portion 341.

The first main portion 331 of the third member 330 includes a plurality of first lamp receiving grooves 331a separated from each other by a predetermined distance. The second main portion 341 of the fourth member 340 includes a plurality of second lamp receiving grooves 341a that are arranged in a way such that each of the lamps 210 can extend from one of the receiving grooves 331a to one of the receiving grooves 341a. Each of the lamps 210 is provided with the first lamp holder 211a and the second lamp holder 212a combined with opposite end portions thereof. The first lamp holder 211a is received in the first lamp receiving groove 331a and the second lamp holder 212a is received in the second lamp receiving groove 341a. Thus, the lamps 210 are received in the bottom mold frame 350 and spaced apart by a predetermined distance.

As shown in FIG. 10, the first member 310 includes a first outer sidewall 313, a first receiving portion 314 extending from the first outer sidewall 313, and a first inner sidewall 315 extending from the first receiving portion 314. Similarly, the second member 320 includes a second outer sidewall 323, a second receiving portion 324 extending from the second outer sidewall 320, and a second inner sidewall 324 extending from the second receiving portion 324.

The first inner sidewall 315 is inclined at a predetermined angle with respect to the first receiving portion 314, and the second inner sidewall 325 is inclined at a predetermined angle with respect to the second receiving portion 324. The first and the second inner sidewalls 315 and 325 change the paths of the light generated by the lamps 210 to increase the amount of the light provided to the LCD panel.

Figure 11:
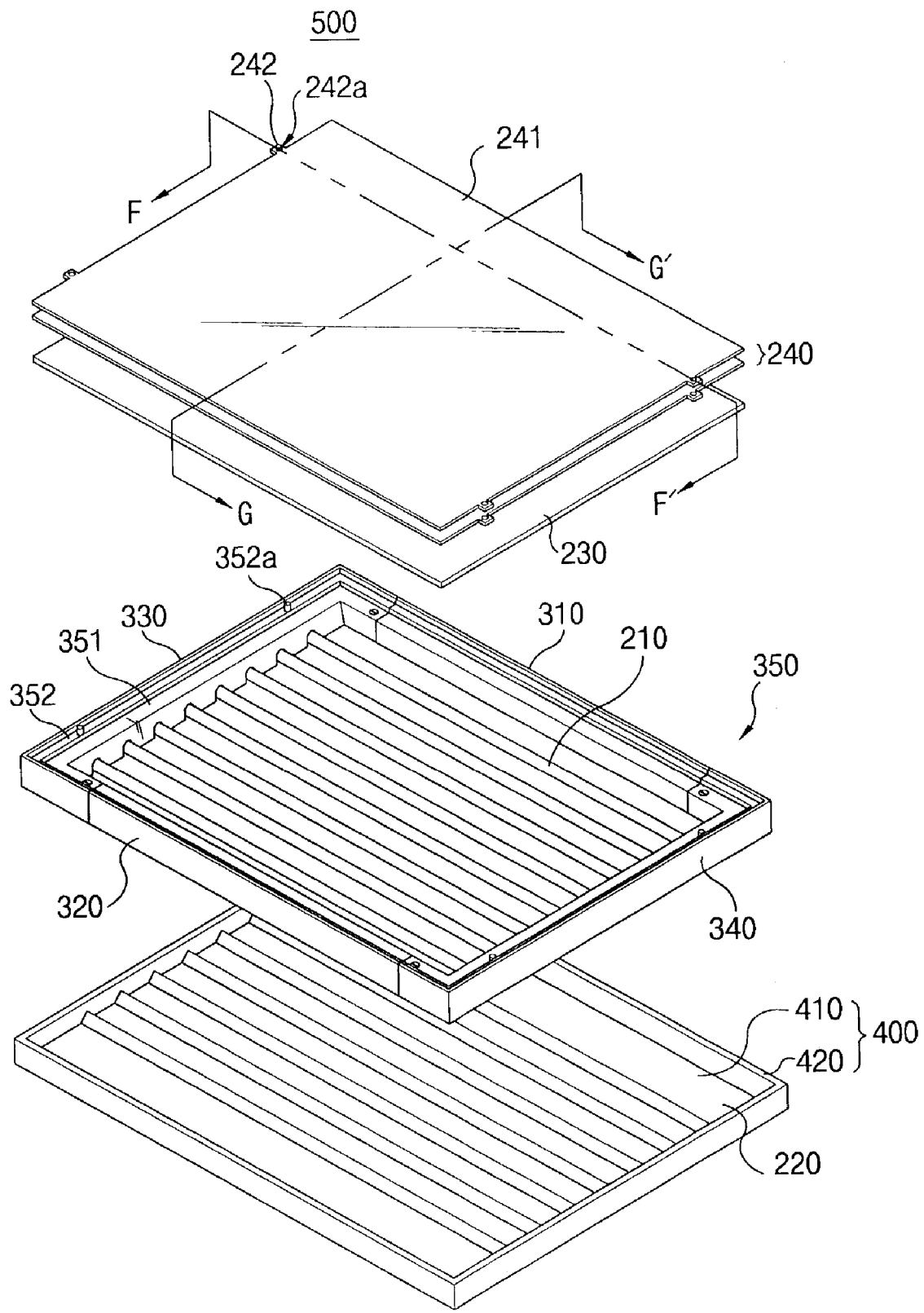
FIG. 11 is an exploded perspective view showing the backlight assembly shown in FIG. 2.
Figure 12:
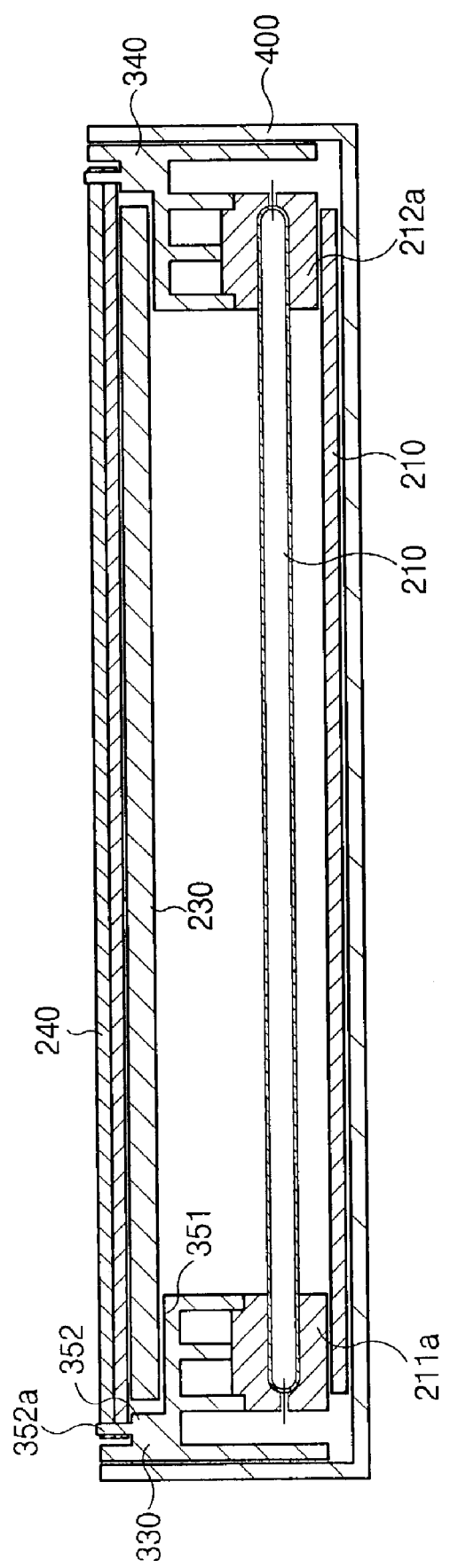
FIG. 12 is a cross-sectional view taken along the line F–F' showing an assembled structure of the backlight assembly shown in FIG. 11.
Figure 13:
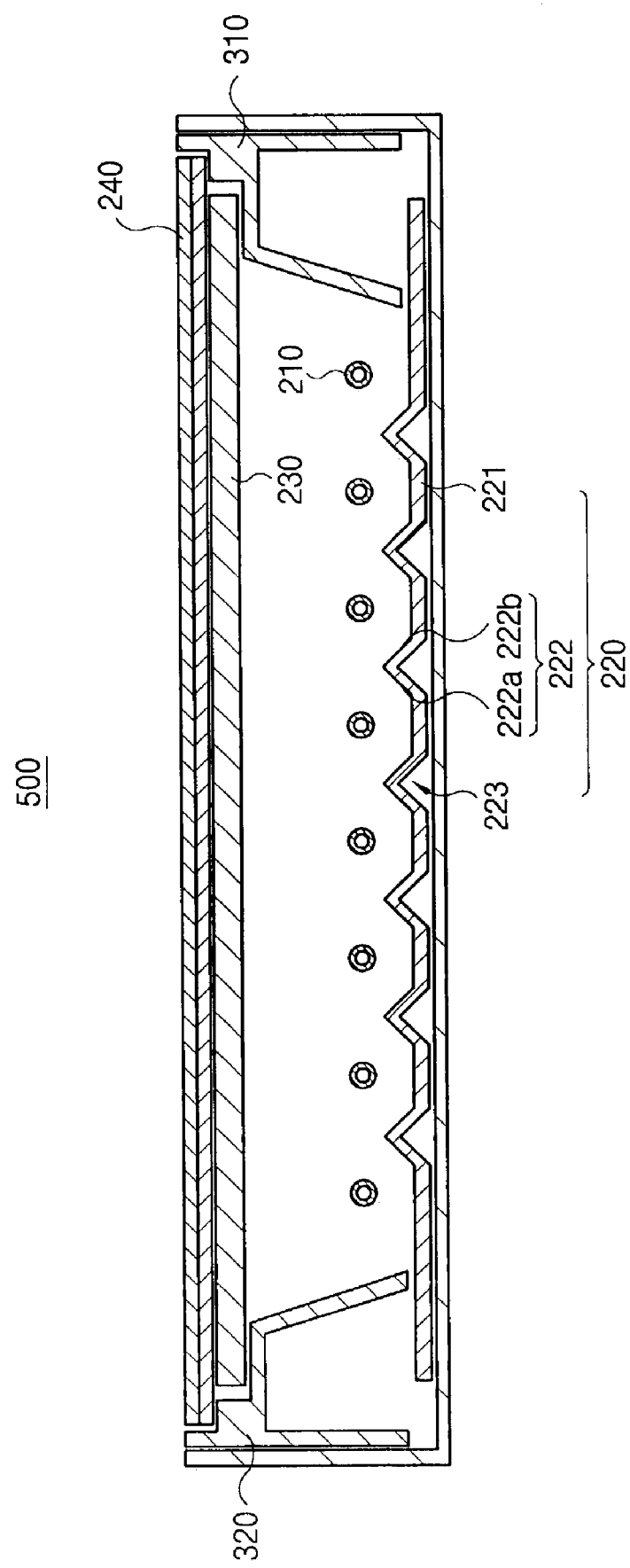
FIG. 13 a cross-sectional view taken along the line G–G' showing an assembled structure of the backlight assembly shown in FIG. 11.

FIG. 11 is an exploded perspective view showing the backlight assembly of FIG. 2. FIG. 12 is a cross-sectional view of the backlight assembly of FIG. 11 after assemblage, as viewed from a plane including line F–F'. FIG. 13 is a cross-sectional view of the backlight assembly of FIG. 12 as viewed from a plane including line G–G'.

Referring to FIGS. 11 and 12, the backlight assembly 500 includes the lamps 210, the reflecting plate 220, the diffusing plate 230, the optical sheet 240 and a receiving container for receiving the lamps 210, the reflecting plate 220, the diffusing plate 230 and the optical sheet 240. The receiving container has the bottom mold frame 350 and the bottom chassis 400.

When the lamps 210 are received in the bottom mold frame 350, the diffusing plate 230 and the optical sheet 240 are disposed on the lamps 210. The bottom mold frame 350 has a first ledge 351 on which the diffusing plate 230 rests. The optical sheet 240 is disposed on the diffusing plate 230. A second ledge 352 supports the optical sheet 240. The second ledge 352 is positioned higher than the first ledge 351, and the height difference is approximately equal to the thickness of the diffusing plate 230. The second ledge 352 includes a fixing protrusion 352a for fixing the optical sheet 240. Each of the third and fourth members 330 and 340 also includes a counterpart of the fixing protrusion 352a for supporting the optical sheet 240.

The optical sheet 240 includes a body 241 having dimensions that substantially match the effective display area of the LCD panel and a fixing portion 242 that extend from both ends of the body 241. The fixing hole 242a that is designed to fit with the fixing protrusion 352a is part of the fixing portion 242. Accordingly, when the optical sheet 240 is received on the second ledge 352, the fixing protrusion 352a is inserted into a fixing hole 242a in the optical sheet 240, securely fixing the optical sheet 240 to the bottom mold frame 350. With the optical sheet 240 securely fixed in such manner, it will not move in the bottom mold frame 350 even though the LCD apparatus is subjected to an external force.

The bottom chassis 400 includes the bottom surface 410 and the sidewall 420 that extends from the bottom surface 410. The bottom chassis 400 receives the reflecting plate 220 on the bottom surface 410 and the bottom mold frame 350 is placed on the reflecting plate 220.

As shown in FIG. 13, the reflecting plate 220 includes a flat portion 221 on which the lamps 210 are received and an inclined portion 222 disposed between the lamps 210. The inclined portion 222 has a first inclined surface 222a inclined at a first angle with respect to the flat portion 221 and a second inclined surface 222b inclined at a second angle with respect to the flat portion 221. The first inclined surface 222a and the second inclined surface 222b contact each other.

When the reflecting plate 220 is received in the bottom chassis 350, a wire receiving space 223 forms between the bottom chassis 400 and the reflecting plate 220. That is, the wire receiving space 223 receives a lamp wire (not shown) that extends from one end of the lamps 210 to another end. Also, the inclined portion 222 controls the paths of the light emitted from the lamps 210 to control the brightness of the light. The bottom mold frame 350 may be coupled with the bottom chassis 400 using a hook or a screw.

According to the backlight assembly and the LCD apparatus, the bottom mold frame that receives the lamps, the diffusing plate and the optical sheet has two or more members that can be combined into a rectangular frame.

Therefore, although the size of the LCD apparatus may become larger, a suitably-sized bottom mold frame may be fabricated using the two or more members having small sizes in comparison with the LCD apparatus. Accordingly, the LCD apparatus manufacturing processes are simplified and cost of production is reduced.

Also, it is able to prevent the bottom mold frame from warping during fabrication, thereby increasing the quality of the LCD apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A direct backlight assembly comprising:
   at least one lamp generating direct backlit light, the lamp having a first lamp end and a second lamp end;
   a first lamp holder receiving the first lamp end and a second lamp holder receiving the second lamp end;
   a light diffusing member diffusing the light to achieve a brightness distribution that fulfills a predetermined criterion; and
   a first receiving container receiving the light diffusing member, the first lamp holder, and the second lamp holder such that a midportion of the lamp extends between the first lamp end and the second lamp end without contacting the first receiving container, the first receiving container including at least two members that are couplable to each other to form a frame,
   wherein the first receiving container comprises:
   a first member having a first main portion and a second main portion extending from a first end of the first main portion in a direction perpendicular to the first main portion; and
   a second member having a third main portion parallel to the first main portion and a fourth main portion extending from a first end of the third main portion in a direction perpendicular to the third main portion, the second member being separably coupled to both ends of the first member.

2. The backlight assembly of claim 1, wherein the first member further comprises a first engaging portion extending from both ends of the second main portion in a direction parallel to the first main portion and, the first engaging portion being designed to be coupled to a second end of the third main portion, and wherein the second member further comprises a second engaging portion extending from both ends of the fourth main portion in a direction parallel to the third main portion, the second engaging portion being designed to be coupled to a second end portion of the first main portion.

3. The backlight assembly of claim 1, wherein the backlight assembly further comprises a first lamp holder having a receiving space receiving the first lamp end and a second lamp holder having a receiving space receiving the second lamp end, and wherein the second and the fourth main portions are provided with a first lamp receiving groove receiving the first lamp holder and a second lamp receiving groove receiving the second lamp holder, respectively.

4. A direct backlight assembly comprising:
   at least one lamp generating direct backlit light, the lamp having a first lamp end and a second lamp end;
   a first lamp holder receiving the first lamp end and a second lamp holder receiving the second lamp end;
   a light diffusing member diffusing the light to achieve a brightness distribution that fulfills a predetermined criterion; and
   a first receiving container receiving the light diffusing member, the first lamp holder, and the second lamp holder such that a midportion of the lamp extends between the first lamp end and the second lamp end without contacting the first receiving container, the first receiving container including at least two members that are couplable to each other to form a frame, the first receiving container including:
   a first member positioned substantially parallel to the lamp;
   a second member positioned substantially parallel to the first member;
   a third member located between and coupled to the first and the second members; and
   a fourth member located between and coupled to the first and the second members, the third and fourth members being coupled to the first and second lamp ends, respectively;
   wherein the third member includes:
   a first main portion having a first end and a second end;
   a first engaging portion extending from the first end of the first main portion in a direction substantially perpendicular to the first main portion; and
   a second engaging portion extending from the second end of the first body portion and positioned substantially parallel to the first engaging portion; and
   wherein the fourth member includes:
   a second main portion located substantially parallel to the first main portion, wherein the second main portion has a first end and a second end;
   a third engaging portion extending from the first end of the second main portion toward the first engaging portion; and
   a fourth engaging portion extending from a second end of the second main portion and positioned substantially parallel to the third engaging portion.

5. The backlight assembly of claim 4 further comprising:
   a first receiving groove located in the first engaging portion receiving a first end portion of the first member,
   a second receiving groove located in the second engaging portion receiving a first end portion of the second member,
   a third receiving groove located in the third engaging portion receiving a second end portion of the first member, and
   a fourth receiving groove located in the fourth engaging portion receiving a second end portion of the second member.

6. The backlight assembly of claim 5, wherein the first and the second engaging portions of the third member are combined with the first ends of the first and the second members with screws, respectively, and the third and the fourth engaging portions of the fourth member are combined with the second ends of the first and the second members with screws, respectively.

7. The backlight assembly of claim 4, wherein the backlight assembly further comprises a lamp holder receiving the first lamp end, and wherein the third member includes a lamp receiving groove receiving the lamp holder.

8. The backlight assembly of claim 4, wherein the backlight assembly further comprises a lamp holder, and wherein the fourth member includes a lamp receiving groove receiving the lamp holder.

9. The backlight assembly of claim 4, wherein the light diffusing member comprises:
   a diffusing plate disposed on the first receiving container, the diffusing plate diffusing the light emitted from the lamps; and
   an optical sheet disposed on the diffusing plate, the optical sheet increasing optical properties for the diffused light, the optical sheet having a body portion and a fixing portion that protrudes from the body portion, and
   fixing protrusions located on the third and the fourth members, the fixing protrusions fixing the optical sheet to the third and the fourth members, wherein the fixing protrusions are designed to be inserted into a fixing hole located on the fixing portion of the optical sheet.

* * * * *